US007851952B2

(12) United States Patent
Liao

(10) Patent No.: US 7,851,952 B2
(45) Date of Patent: Dec. 14, 2010

(54) VOICE COIL MOTOR WITH GUIDING POSTS AND STOPPING BARS

(75) Inventor: Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 133 days.

(21) Appl. No.: 12/406,194

(22) Filed: Mar. 18, 2009

(65) Prior Publication Data

US 2010/0117460 A1   May 13, 2010

(30) Foreign Application Priority Data

Nov. 10, 2008   (CN)   .......................... 200810305467

(51) Int. Cl.
*H02K 41/00* (2006.01)
*G02B 15/14* (2006.01)

(52) U.S. Cl. ................... 310/12.16; 310/12.31; 310/14; 359/814; 359/823; 359/824; 359/606

(58) Field of Classification Search ............. 310/12.16, 310/12.31, 14; 359/606, 696, 694, 814, 823, 359/824
See application file for complete search history.

(56) References Cited

U.S. PATENT DOCUMENTS 7,391,579 B2 *   6/2008   Ho et al. ...................... 359/696
2007/0108847 A1 *   5/2007   Chang .......................... 310/12

* cited by examiner

*Primary Examiner*—Quyen Leung
*Assistant Examiner*—Leda Pham
(74) *Attorney, Agent, or Firm*—Clifford O. Chi

(57) ABSTRACT

An exemplary voice coil motor includes a hollow stationary magnetic field generator, a movable magnetic field generator, two elastic members, a hollow case and a base. The movable magnetic field generator is received in the stationary magnetic field generator. The two elastic members are adjacent to two ends of the stationary magnetic field generator. The case and the base serve as a package for all of the above elements. The case has a top sheet. The movable magnetic field generator has guiding posts slidably received in the top sheet, and stopping bars. The stopping bars of the movable magnetic field generator are capable of limiting the movement of the movable magnetic field generator toward the top sheet by abutting the top sheet.

20 Claims, 5 Drawing Sheets

VOICE COIL MOTOR WITH GUIDING POSTS AND STOPPING BARS

BACKGROUND

1. Technical Field

The present disclosure relates to voice coil motors.

2. Description of Related Art

Voice coil motors (VCMs) are widely used, for example, as lens actuators in camera modules. Camera modules are becoming progressively more miniaturized over time, and thus VCMs are correspondingly being required to be made smaller and smaller.

A typical VCM includes a stationary magnetic field generator, a movable magnetic field generator, at least one elastic member attached to the stationary magnetic field generator, and a case receiving all the above-mentioned elements therein. The movable magnetic field generator has coils of wire wrapped around a periphery thereof, and, for example, can have lenses received therein. The movable magnetic field generator together with the lenses can be moved by the magnetic field generated by the stationary magnetic field generator. The case has a top sheet. The movable magnetic field generator usually has a plurality of pins formed thereon. The pins engage with the elastic member and extend through the elastic member to face the top sheet of the case. The elastic member provides reverting force on the movable magnetic field generator. When the pins contact the top sheet, it means that the movable magnetic field generator has moved as far as it can go.

However, in the case of a highly miniaturized VCM, it is difficult to make the VCM, and the VCM may not be able to perform satisfactorily.

What is needed, therefore, is a voice coil motor which can overcome the above shortcomings.

BRIEF DESCRIPTION OF THE DRAWINGS

Many aspects of the present voice coil motor can be better understood with reference to the following drawings. The components in the drawings are not necessarily drawn to scale, the emphasis instead being placed upon clearly illustrating the principles of the present voice coil motor. Moreover, in the drawings, like reference numerals designate corresponding parts throughout the several views.

DETAILED DESCRIPTION OF EMBODIMENTS

Embodiments of the present voice coil motor will now be described in detail below and with reference to the drawings.

Figure 1:
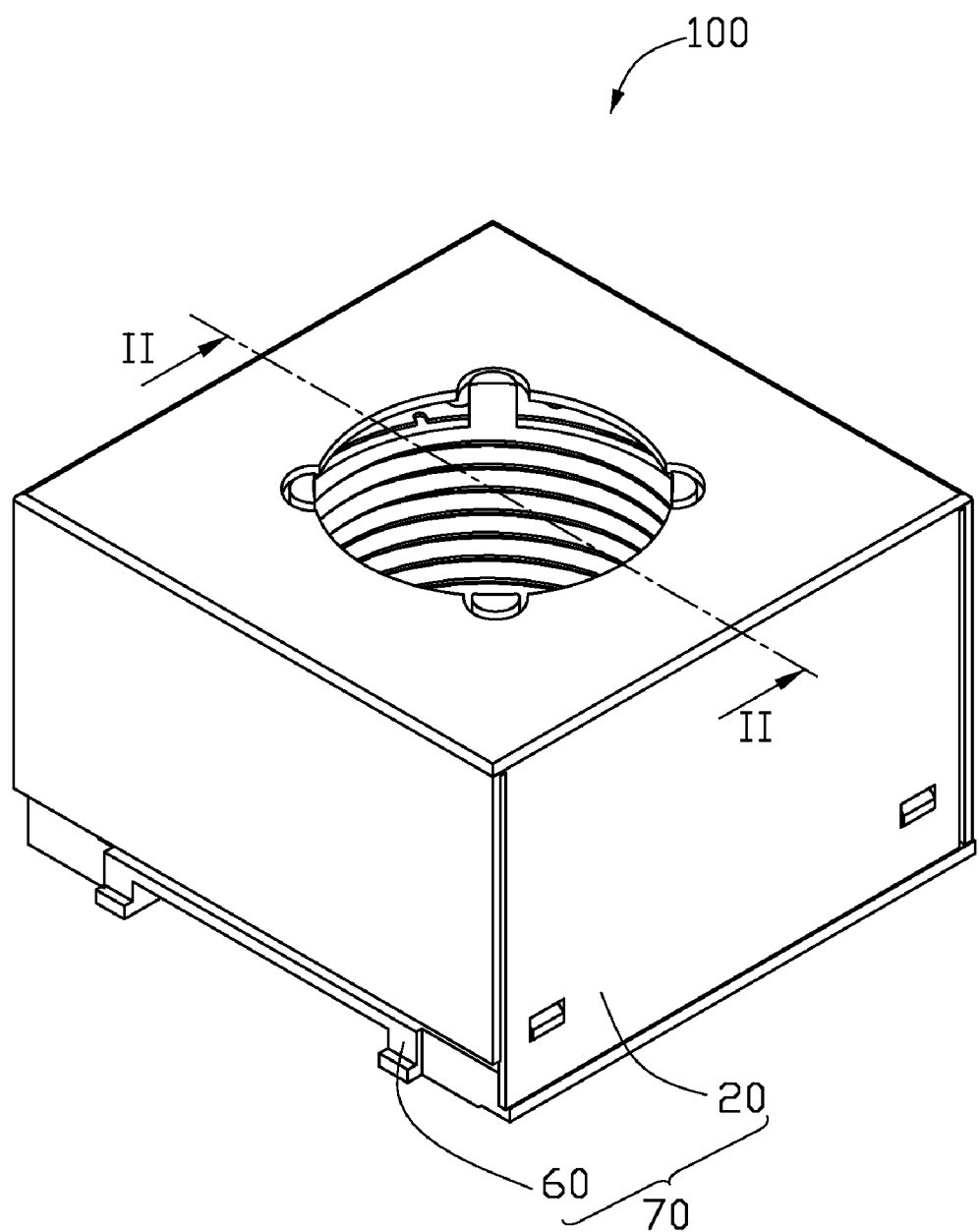
FIG. 1 is a schematic view of a voice coil motor in accordance with a first embodiment.
Figure 2:
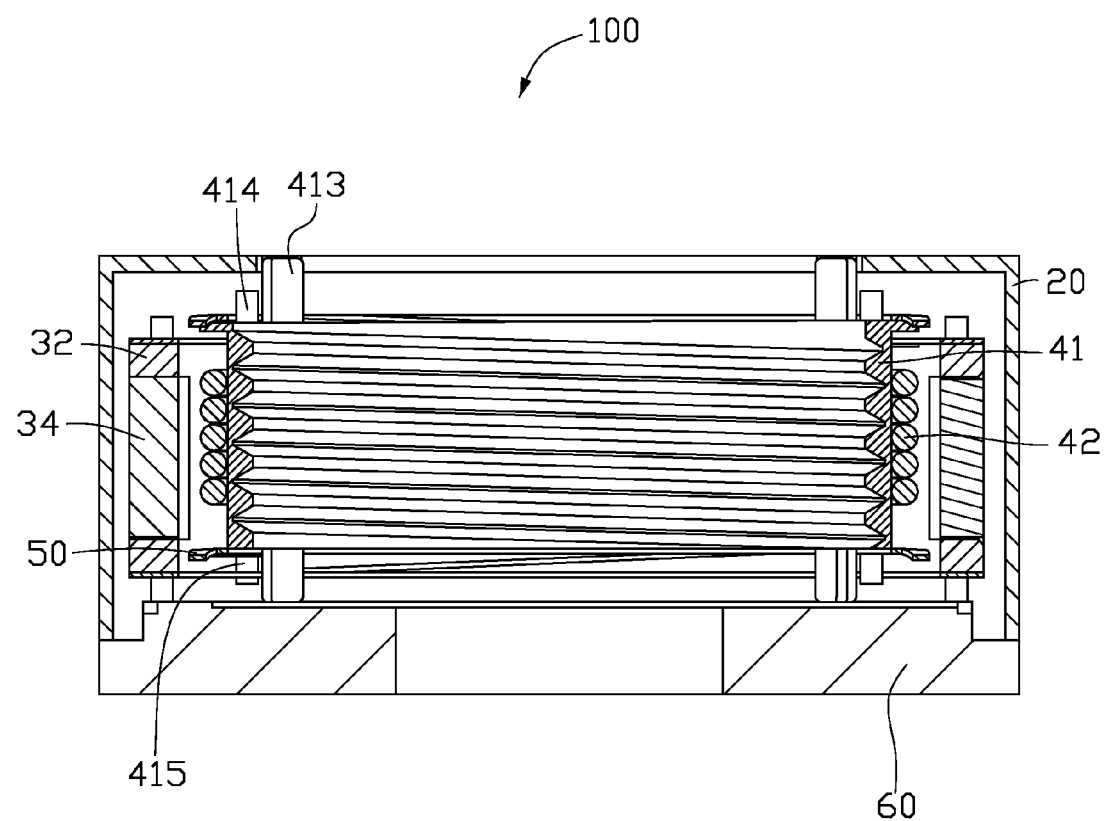
FIG. 2 is a cross-sectional view of the voice coil motor of FIG. 1, taken along line II-II thereof.
Figure 3:
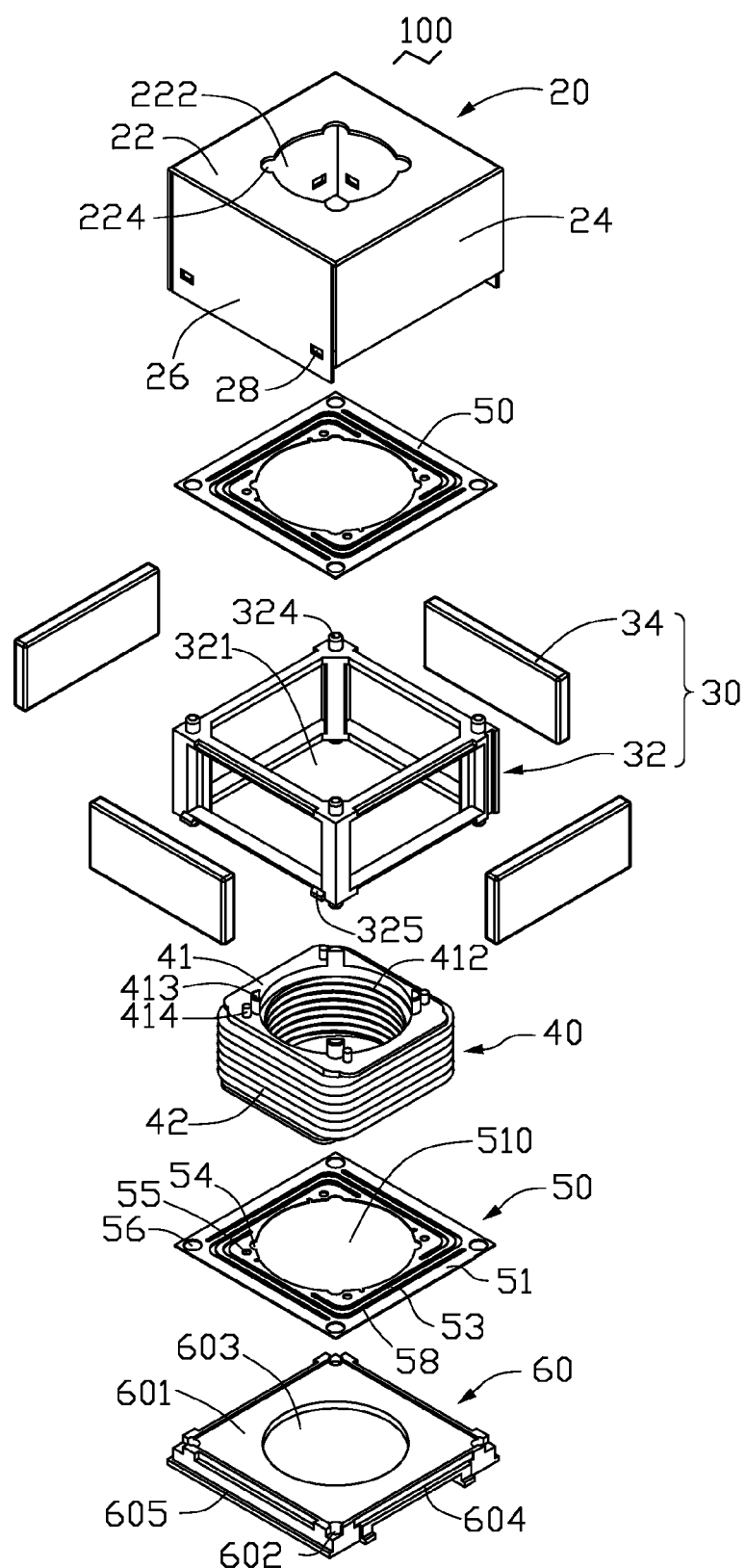
FIG. 3 is a disassembled view of the voice coil motor of FIG. 1, showing all the parts rotated together 90° counterclockwise from FIG. 1.

Referring to FIGS. 1 to 3, an exemplary voice coil motor (VCM) 100 in accordance with a first embodiment is shown. The VCM 100 includes a hollow stationary magnetic field generator 30, a hollow movable magnetic field generator 40, a first (top) and a second (bottom) elastic members 50, a hollow case 20, and a base 60. The movable magnetic field generator 40 is received in the stationary magnetic field generator 30. The first and second elastic members 50 are disposed on two ends of the stationary magnetic field generator 30. The case 30 and the base 60 cooperatively form a package 70 for all of the above-mentioned elements. In one embodiment, the case 30 and the base 60 are both made from an electromagnetic interference shielding material, e.g., an alloy of nickel and iron.

The stationary magnetic field generator 30 includes a retaining frame 32 and a plurality of permanent magnetic elements 34. The retaining frame 32 is generally rectangular shaped, and has four sides. Each side includes an upper horizontal beam and a lower horizontal beam. The retaining frame 32 defines a through hole 321 in a center thereof. Two opposite of the four lower horizontal beams are provided with buckles 325, with each of such two lower horizontal beams having two buckles 325 formed thereon. Each of top and bottom ends of the retaining frame 32 has four protrusions 324 formed on four corners thereof. The magnetic elements 34 are mounted to the sides of the retaining frame 32, respectively, and serve as sidewalls of the stationary magnetic field generator 30. The stationary magnetic field generator 30 is configured for generating a first magnetic field.

The movable magnetic field generator 40 includes a hollow core member 41, and a coil or coils of wire 42 wrapped around the core member 41. The core member 41 defines a through hole 412 in a center thereof. The through hole 412 can serve as a receiving space for receiving one or more lenses. Each of top and bottom ends of the core member 41 has four guiding posts 413 extending therefrom parallel to a central axis of the core member 41. The top end of the core member 41 has four stopping bars 414 extending therefrom parallel to the central axis of the core member 41. The bottom end of the core member 41 has four holding bars 415 extending therefrom parallel to the central axis of the core member 41. The guiding posts 413 of the top end of the core member 41 are longer than the stopping bars 414.

Each of the first and second elastic members 50 is in the form of a single, slightly humped rectangular sheet, with a through hole 510 defined in a center thereof. Each of the first and second elastic members 50 includes a plurality of generally rectangular (frame-shaped) elastic portions 53 defined around the through hole 510, and a peripheral portion 51 defined around the elastic portions 53. The elastic portions 53 are separated from each other by a plurality of slots 58 defined in the respective first or second elastic member 50, thereby enabling the elastic portions 53 to have elasticity. In the illustrated embodiment, there are four slots 58, each of which is generally U-shaped. Each of the first and second elastic members 50 also has four first guiding holes 54, four first engaging holes 55, and four second engaging holes 56 defined therein. The first guiding holes 54 are defined in an inner peripheral wall of the first and second elastic members 50. In the illustrated embodiment, the first guiding holes 54 are in the form of cutouts, which are in communication with the through hole 510. The first engaging holes 55 are defined in an inmost one of the elastic portions 53. The second engaging holes 56 are defined in the peripheral portion 51.

The case 20 includes a top sheet 22, two first side sheets 24 arranged opposite to each other, and two second side sheets 26 arranged opposite to each other. The second side sheets 26 each have two openings 28 defined therein. A through hole 222 is defined in a center of the top sheet 22, and four second guiding holes 224 are defined in an inner peripheral wall of the top sheet 22. In the illustrated embodiment, the second guiding holes 224 are in the form of cutouts, which are in communication with the through hole 222.

The base 60 includes a through hole 603 defined in a center thereof, and four notches 602 defined in a top surface 601 thereof. The base 60 further defines two first grooves 604 on two of opposite sides thereof, and two second grooves 605 on another two of opposite sides thereof.

In assembly of the VCM 100, the protrusions 324 extend through and are fixedly engaged in the respective second engaging holes 56 of the first and second elastic members 50. In the illustrated embodiment, the peripheral portion 51 of each of the first and second elastic members 50 is fixed in position at inmost ends of the corresponding four protrusions 324, with the peripheral portion 51 abutting the respective top or bottom end of the retaining frame 32 (see FIG. 2). The stopping bars 414 extend through and engage in the respective first engaging holes 55 of the first elastic member 50. In a preferred embodiment, the stopping bars 414 are fixedly engaged in the respective first engaging holes 55 of the first elastic member 50. The holding bars 415 are fixedly engaged in the respective first engaging holes 55 of the second elastic member 50. There is a gap between each of the stopping bars 414 and the top sheet 22 of the case 20, and between each of the holding bars 415 and the top surface 601 of the base 60. The guiding posts 413 extend through the corresponding first guiding holes 54.

The protrusions 324 at the bottom end of the retaining frame 32 are positioned in the notches 602 of the base 60. In one embodiment, these bottom protrusions 324 are fittingly received in the notches 602 and thereby fixed in position. Thus, the stationary magnetic field generator 30 is attached to the base 60. In the illustrated embodiment, the guiding posts 413 of the bottom end of the core member 41 contact the top surface 601 of the base 60. Then the case 20 is lowered onto the base 60, and the buckles 325 are buckled in the openings 28 of the case 20. The case 20 is thereby mounted to the base 60, with bottom ends of the first side sheets 24 of the case 20 being received in the first grooves 604, and bottom ends of the second side sheets 26 of the case 20 being received in the second grooves 605. Thus, assembly of the VCM 100 is completed. In the illustrated embodiment, the guiding posts 413 of the top end of the core member 41 are slidably received in the second guiding holes 224.

In use of the VCM 100, when a current is applied to the coils of wire 42 of the movable magnetic field generator 40, a second magnetic field is generated by the movable magnetic field generator 40. If the second magnetic field opposes the first magnetic field generated by the stationary magnetic field generator 30, the movable magnetic field generator 40 is repelled to move away from the stationary magnetic field generator 30, i.e., away from the base 60 in the present embodiment.

Due to the guiding posts 413 being received in the first guiding holes 54, and to the guiding posts 413 of the top end of the core member 41 being movably received in the second guiding holes 224, the movable magnetic field generator 40 is moved along the lengthwise direction of the guiding posts 413, i.e., along the central axis of the core member 41.

The stopping bars 414 of the top end of the core member 41 contact the top sheet 22 when the movable magnetic field generator 40 has moved up as far as it is permitted to go. In this way, the stopping bars 414 can limit the movement of the movable magnetic field generator 40.

When the current applied to the coils of wire 42 is cut off, the movable magnetic field generator 40 returns to its starting point due to rebounding of the elastic members 50, with the guiding posts 413 at the bottom end of the core member 41 again contacting the top surface 601 of the base 60.

It is understood that in an alternative embodiment, the second elastic member 50 can be omitted. In such case, the holding bars 415 of the movable magnetic field generator 40 can also be omitted.

Figure 4:
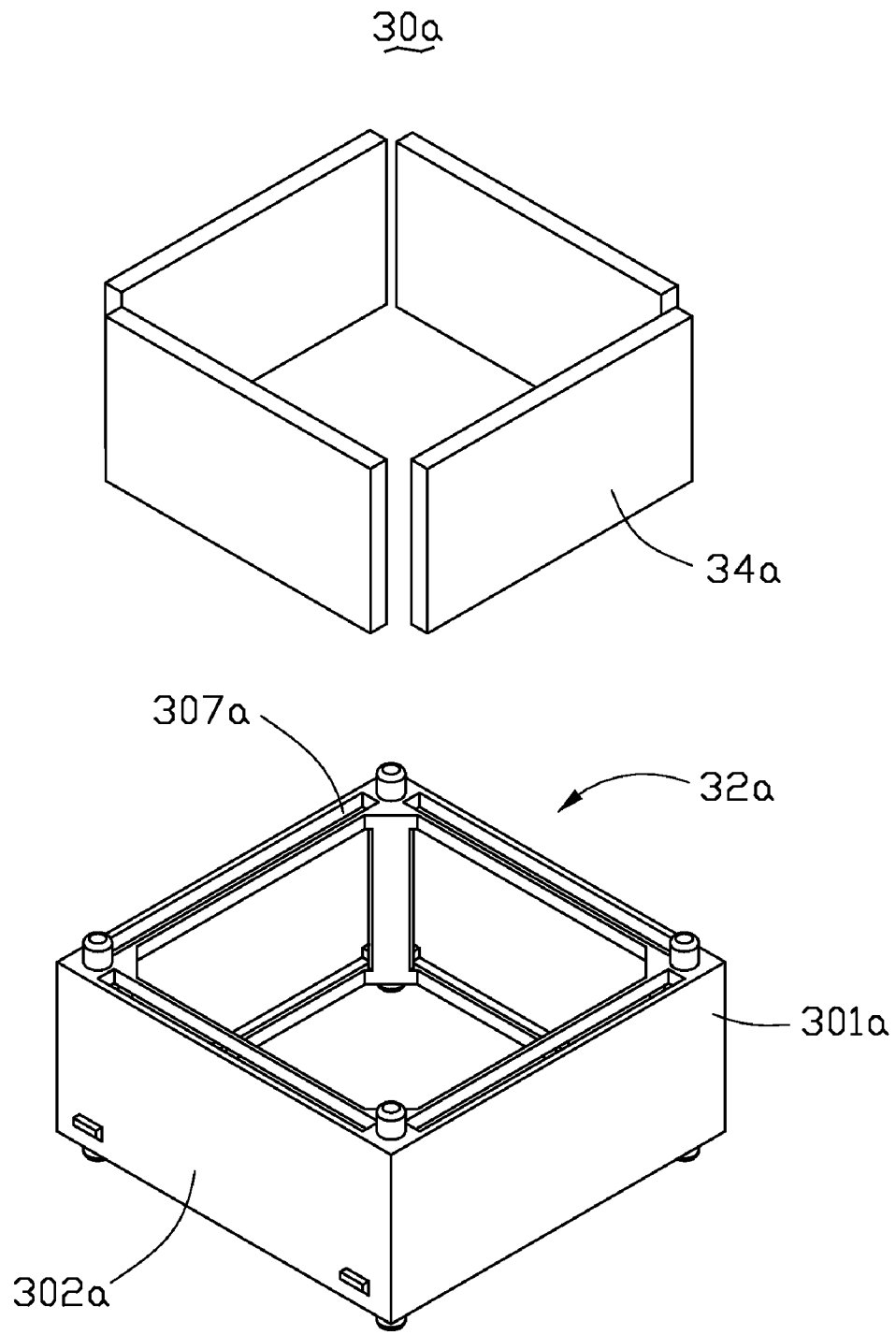
FIG. 4 is a schematic view of a stationary magnetic field generator of a voice coil motor in accordance with a second embodiment.

Referring to FIG. 4, an exemplary stationary magnetic field generator 30a of a VCM in accordance with a second embodiment is shown. The stationary magnetic field generator 30a is similar to the stationary magnetic field generator 30 illustrated and described above; however, a retaining frame 32a includes two first sidewalls 301a and two second sidewalls 302a. Each of the first and second sidewalls 301a, 302a is substantially a thin plate, and has an upper horizontal beam provided at the top thereof. An opening 307a is defined in each upper horizontal beam. Magnetic elements 34a are received through the openings 307a and retained in position abutting the first and second sidewalls 301a, 302a, respectively.

Figure 5:
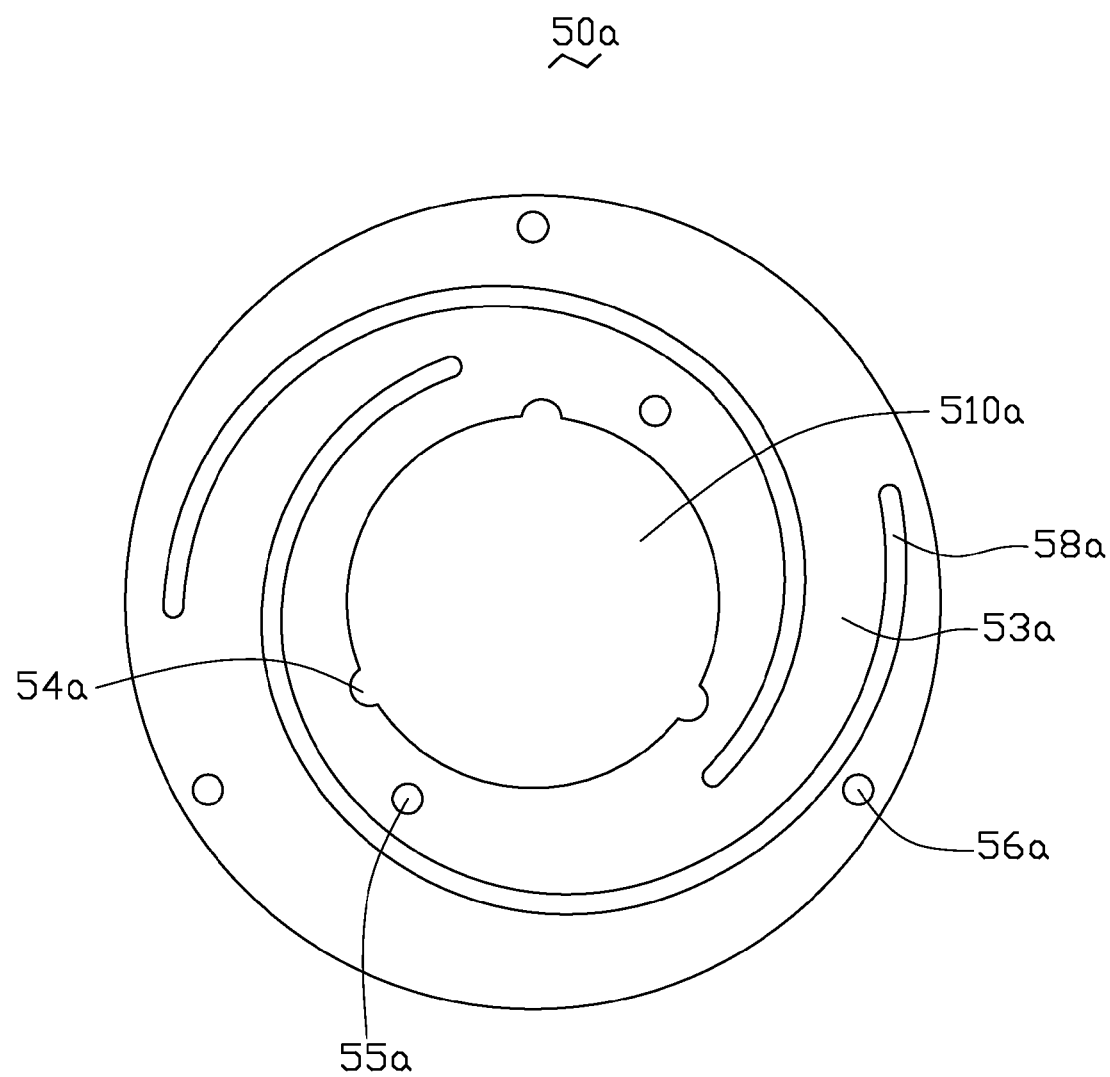
FIG. 5 is a plan view of an elastic member of a voice coil motor in accordance with a third embodiment.

Referring to FIG. 5, an exemplary elastic member 50a of a VCM in accordance with a third embodiment is shown. In this embodiment, there are two elastic members 50a, which are similar to the first and second elastic members 50 illustrated and described above. However, each elastic member 50a is in the form of a single, slightly humped circular sheet. Each elastic member 50a has two generally circular (or generally annular) elastic portions 53a defined around a through hole 510a. Two slots 58a are defined in the elastic member 50a, thereby enabling the elastic portions 53a to have elasticity. In the illustrated embodiment, the slots 58a are arc-shaped. There are three first guiding holes 54a, and three second engaging holes 56a. There are two first engaging holes 55a. It is understood that the elastic members 50a are applied to a stationary magnetic field generator and a movable magnetic field generator, wherein the stationary magnetic field generator has three protrusions, and the movable magnetic field generator has two stopping bars and three guiding posts.

It is further understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A voice coil motor, comprising:
  a hollow stationary magnetic field generator having a first end and an opposite second end, the first and second ends each having a plurality of protrusions formed thereon;
  a movable magnetic field generator movably received in the stationary magnetic field generator, the movable magnetic field generator comprising a core member having a first end and an opposite second end, and one or more coils of wire wrapped around the core member between the first end and the second end, the first end having a plurality of guiding posts extending therefrom parallel to a central axis of the core member, and a plurality of stopping bars extending therefrom;
  a first and a second elastic members each comprising a plurality of first engaging holes defined therein, the first elastic member further comprising a plurality of second engaging holes and a plurality of first guiding holes defined therein, the first and second elastic members being disposed adjacent the first and second ends of the stationary magnetic field generator, respectively, the movable magnetic field generator disposed between the first and second elastic members with each of the guiding posts extending through a respective first guiding hole, and each of the stopping bars extending through a respective first engaging hole, each of the protrusions extending through a respective second engaging hole;
  a hollow case receiving the stationary magnetic field generator, the movable magnetic field generator, and the first and second elastic members therein, the case comprising a top sheet and a plurality of side sheets, the top sheet having a plurality of second guiding holes defined therein, wherein when the movable magnetic field generator is moved, the guiding posts are slidable in the second guiding holes, and the stopping bars of the first end of the movable magnetic field generator are capable of limiting the movement of the movable magnetic field generator toward the top sheet by abutting the top sheet; and a base mounted to the bottom of the case, the protrusions of the second end of the stationary magnetic field generator being attached to the base.

2. The voice coil motor as described in claim 1, wherein the second elastic member further comprises a plurality of second engaging holes and a plurality of first guiding holes defined therein, the second end of the movable magnetic field generator has a plurality of guiding posts and a plurality of holding bars extending therefrom parallel to a central axis of the core member, each of the guiding posts of the second end of the movable magnetic field generator extending through a respective first guiding hole of the second elastic member, each of the holding bars extending through and being fixedly engaged in a respective first engaging hole of the second elastic member.

3. The voice coil motor as described in claim 1, wherein the guiding posts are longer than the stopping bars.

4. The voice coil motor as described in claim 2, wherein the holding bars are spaced from the base.

5. The voice coil motor as described in claim 2, wherein the stationary magnetic field generator, the core member of the movable magnetic field generator, the first and second elastic members, the top sheet of the case and the base each have a through hole defined in a center thereof, and the through holes are aligned with each other.

6. The voice coil motor as described in claim 5, wherein the first guiding holes of each of the first and second elastic members are defined in an inner wall of the respective first or second elastic member in communication with the through hole of the respective first or second elastic member, and the second guiding holes of the top sheet are defined in an inner wall of the top sheet in communication with the through hole of the top sheet.

7. The voice coil motor as described in claim 5, wherein each of the first and second elastic members is substantially in the form of a sheet, and comprises a plurality of elastic portions around the through hole of the respective first or second elastic member and a peripheral portion around the elastic portions, the first engaging holes being defined in at least one of the elastic portions, and the second engaging holes being defined in the peripheral portion.

8. The voice coil motor as described in claim 7, wherein each of the first and second elastic members has a plurality of slots defined therein, the slots enabling the elastic portions to have elasticity.

9. The voice coil motor as described in claim 1, wherein the stationary magnetic field generator comprises a retaining frame having a plurality of sides, and a plurality of permanent magnetic elements mounted to the respective sides of the retaining frame, and the protrusions are provided on first and second ends of the retaining frame.

10. The voice coil motor as described in claim 9, wherein each side comprises an upper horizontal beam and a lower horizontal beam, and each permanent magnetic element is situated between the corresponding upper horizontal beam and lower horizontal beam.

11. The voice coil motor as described in claim 9, wherein each side comprises a sidewall, each sidewall is substantially a thin plate and has an upper horizontal beam provided at the top thereof, an opening is defined in each upper horizontal beam, and each permanent magnetic element is at least partly received in the opening.

12. The voice coil motor as described in claim 1, wherein each of the case and the base is made from an electromagnetic interference shielding material.

13. A voice coil motor, comprising:

a hollow stationary magnetic field generator configured for generating a first magnetic field;

a movable magnetic field generator movably received in the stationary magnetic field generator, the movable magnetic field generator comprising a core member having a first end and an opposite second end, and coils of wire wrapped around the core member between the first end and the second end, the first end having a plurality of guiding posts extending therefrom parallel to a central axis of the core member, and a plurality of stopping bars extending therefrom, the movable magnetic field generator being capable of generating a second magnetic field opposing the first magnetic field such that the stationary magnetic field generator is capable of moving the movable magnetic field generator;

an elastic member attached to the stationary magnetic field generator, the elastic member having a plurality of first guiding holes and first engaging holes formed therein, the guiding posts and the stopping bars extending through the respective first guiding holes and first engaging holes; and a hollow case receiving the stationary magnetic field generator, the movable magnetic field generator and the elastic member therein, the case having a top sheet with a plurality of second guiding holes formed therein, wherein when the movable magnetic field generator is moved, the guiding posts are movable in the second guiding holes, and the stopping bars of the first end of the movable magnetic field generator are capable of contacting the top sheet so as to limit the movement of the movable magnetic field generator toward the top sheet.

14. The voice coil motor as described in claim 13, wherein the guiding post is longer than the distance bar.

15. The voice coil motor as described in claim 13, further comprising a base, the stationary magnetic field generator and the case are opened and attached to the base.

16. The voice coil motor as described in claim 15, wherein the stationary magnetic field generator, the core member of the movable magnetic field generator, the elastic member, the top sheet of the case and the base each have a through hole defined in a center thereof, and the through holes are aligned with each other.

17. The voice coil motor as described in claim 16, wherein the first and second guiding holes are formed in an inner wall of and in communication with the respective through holes of the elastic member and the top sheet.

18. The voice coil motor as described in claim 16, wherein the elastic member is substantially in the form of a sheet, and comprises a plurality of elastic portions around the through hole thereof and a peripheral portion around the elastic portions, the first engaging holes being defined in at least one of the elastic portions.

19. The voice coil motor as described in claim 13, wherein the stationary magnetic field generator comprises a retaining frame having four sides, and four permanent magnetic elements mounted to the respective sides of the retaining frame.

20. The voice coil motor as described in claim 19, wherein the elastic member is square shaped and has four second engaging holes formed therein, the retaining frame has four protrusions extending thereof, the protrusions engaging in the respective second engaging holes.

* * * * *